United States Patent Office

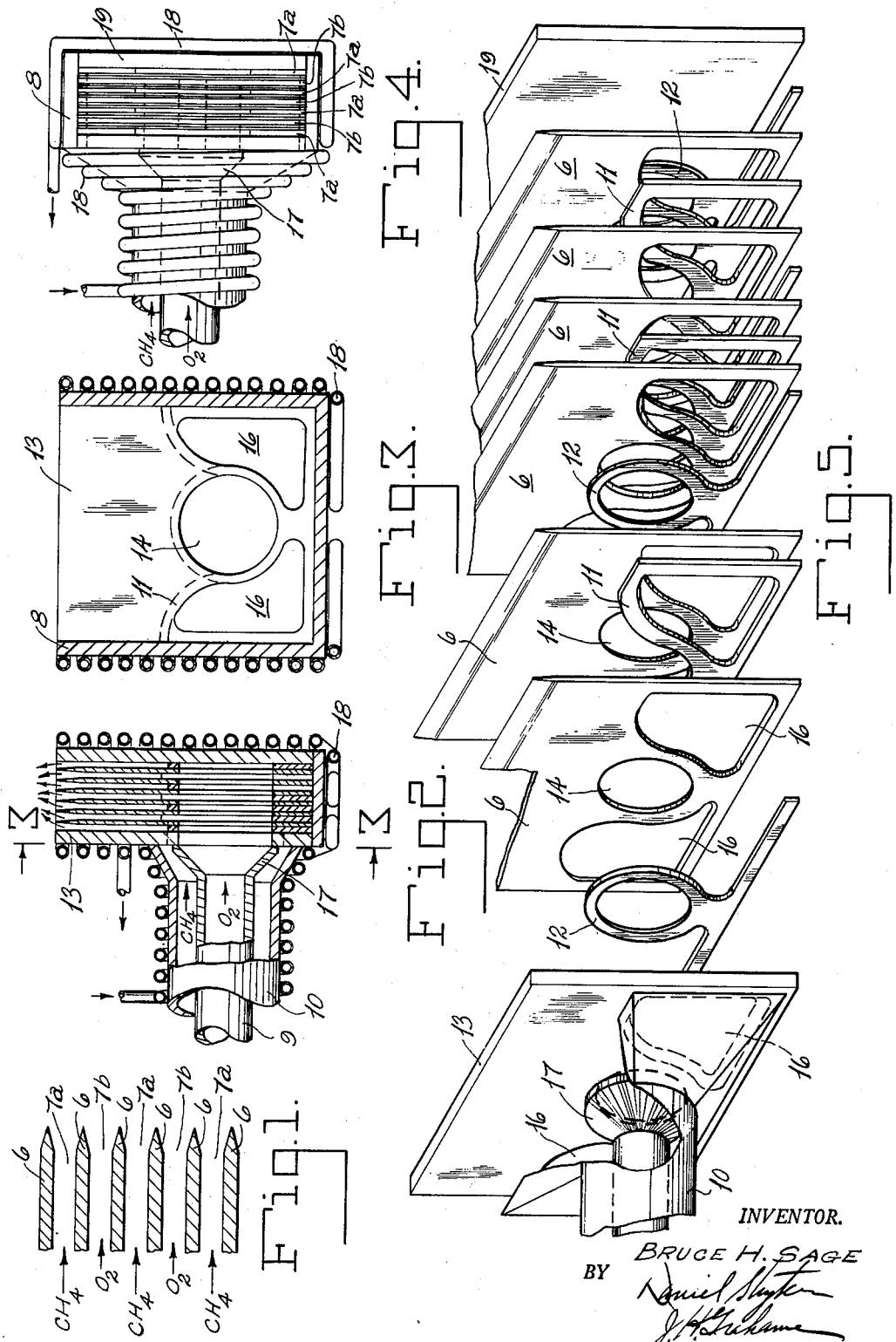

2,713,894
Patented July 26, 1955

2,713,894

METHOD AND APPARATUS FOR PARTIAL COMBUSTION OF GASIFORM HYDROCARBONS

Bruce H. Sage, Altadena, Calif., assignor to Texaco Development Corporation, New York, N. Y., a corporation of Delaware Application August 10, 1951, Serial No. 241,303

3 Claims. (Cl. 158—99)

This invention relates to an apparatus and process for the production of carbon monoxide and hydrogen by the partial combustion of gasiform hydrocarbons. The invention is particularly applicable to the generation of carbon monoxide and hydrogen by the partial combustion of a gaseous hydrocarbon with enriched air or substantially pure oxygen. In one of its more specific aspects, this invention relates to apparatus for forming mixtures of fuel gas and an oxygen-containing gas in a manner particularly suited to the production of carbon monoxide and hydrogen.

In accordance with the present invention, separate streams of a gaseous fuel and an oxygen-containing gas are injected into a reaction zone in which partial oxidation of the fuel takes place. The gas streams are introduced as alternate parallel sheets in unidirectional turbulent flow. This laminar arrangement of flowing reactant streams is advantageous to the partial oxidation reaction as will be more fully explained hereinafter.

Gas mixtures consisting essentially of carbon monoxide and hydrogen are commercially important as a source of hydrogen for hydrogenation reactions and as a source of feed gas for the synthesis of hydrocarbons, oxygen-containing organic compounds, or ammonia. There is a great deal of interest at the present time in the production of carbon monoxide and hydrogen by the partial combustion of a hydrocarbon with an oxygen-rich gas. Of especial interest is the reaction by which a gaseous hydrocarbon, such as methane or natural gas, is reacted with oxygen-enriched air or substantially pure oxygen.

The partial combustion of a hydrocarbon fuel with oxygen-enriched air or with relatively pure oxygen to produce carbon monoxide and hydrogen presents unique problems not normally encountered in the burner art. It is necessary for example, to effect very rapid and complete mixing of the reactants. Also, it is necessary to take special precautions to protect the burner, or mixer, from overheating. Because of the reactivity of oxygen with the metal itself from which a suitable burner may be fabricated, it is extremely important to prevent the burner elements from reaching those temperatures at which rapid oxidation of the elements takes place. In this connection, it is important that the reaction between the hydrocarbon and oxygen take place entirely outside the burner proper and to prevent localized concentration of combustible mixtures at or near the surface of the burner elements. The burner elements are subjected to heating by radiation from the reaction, even though the reaction takes place beyond the point of discharge from the burner. Inadequate mixing results in such concentrations of oxygen in localized areas that relatively complete combustion of a portion of the fuel takes place in these areas. This releases large quantities of energy adjacent the burner and overheats the burner elements by radiation and convection.

Another problem peculiar to this reaction is the tendency for free carbon to form either on the burner or within the reaction space due primarily to inadequate mixing of the gases. The formation of carbon on the surface of the burner often leads to burner failure, since it interferes with the mixing of the gases and causes localized concentrations of oxygen which overheat burner elements or associated refractory.

With conventional burners it has been found that it is necessary to use a quantity of oxygen in excess of the theoretical to prevent carbon formation. This aggravates the problem of cooling the burner and often causes undesirably high reaction temperatures. Steam is sometimes required to control the reaction temperature and hold it at a reasonable level. The problem is further aggravated by the fact that in the partial combustion of gases it is desirable to charge the reactant gases to the burner in a highly preheated state to reduce the oxygen requirements and give a maximum yield of the desired product gas.

In the generation of carbon monoxide and hydrogen from natural gas and relatively pure oxygen for the synthesis of hydrocarbons in commercial quantities it has been found that conventional burners are unsatisfactory for one or more reasons given above. These burners generally are characterized by failure of burner elements, particularly by burning away of metal at the burner tips even where these elements have been water cooled.

In the burner art, several types of burners are known. In view of the foregoing discussion of problems, the type burner in which reactants are premixed and injected from the burner at rates of flow in excess of the rate of flame propagation suggests itself. This type burner has not proven satisfactory, however, with relatively pure oxygen and hydrocarbons, for example. The reason that these burners are unsatisfactory is that there is always present a film of gases along the surface of the conduit or orifice through which they are discharged and this film is moving at a relatively slow rate. The highly reactive oxygen-hydrocarbon mixture reacts along this film or surface soon causing failure of the burner.

The present invention relates to burners in which the reactants are mixed at the point of discharge from the burner. It is important in this type burner to insure rapid and adequate mixing of the reactant gases after they are discharged from the burner to prevent localized concentrations of oxygen in the reaction mixture which would result in hot spots near the burner. It is also important to prevent, insofar as possible, the formation of mixtures of reactants adjacent the burner elements, e. g., along the surface of an element.

Contrary to prior practices, the burner of this invention involves injecting alternate streams of reactants adjacent one another as relatively thin, substantially parallel streams. Sheets of reactants flowing in thin streams in the same direction and substantially parallel to one another are formed by this burner. In a conventional burner, gross mixing of the reactants takes place, as a result of impingement of the streams upon one another, after which the gases must intimately mix by diffusion. In the burner of this invention, "fine grain" turbulence, i. e., small eddies, is developed in the gas streams. Upon contact between the streams, mixing of the gases by interdiffusion between these small eddies is very rapid. This gives superior performance of the burner, not obtainable by injecting the streams in intersecting relationship to one another. The resulting reaction is characterized by relative freedom from carbon formation, as contrasted with impingement type burners operated under comparable conditions.

In one specific embodiment of a burner of this invention, thin sheets of reactant gases are formed by the burner with alternate streams of hydrocarbon gas and oxygen-containing gas.

The gases are introduced at velocities such that turbulent flow of the gas streams is attained. The velocity of the streams may range from about 75 feet per second to about 600 feet per second. It has been found that gas stream velocities in excess of 150 feet per second give best results. The velocities of the fuel gas stream and of the oxygen-containing gas stream should be substantially equal. Preferably, variations in the velocities of the streams are not in excess of ten per cent.

To minimize the formation of carbon, the thickness of the reactant streams should be not greater than about one fourth of an inch. In general, the thickness of the gas streams are preferably kept within the range of from about one thirty-second of an inch to about one fourth of an inch.

Suitable burner structures for carrying out the process of this invention are shown in the accompanying drawings to illustrate specific ways in which the thin streams of reactant gases may be formed.

Figure 1 is a diagrammatic drawing illustrating the flow of gases through the burner of my invention.

Figure 2 is an elevational view in cross-section of one embodiment of a burner structure suitable for carrying out the process of my invention.

Figure 3 is an elevational view in cross-section taken along the plane 3—3 of Figure 2.

Figure 4 is a plan view of the burner.

Figure 5 is an exploded perspective view illustrating the internal construction of the burner.

With reference to Figure 1 of the drawings, the principle of the burner of this invention is illustrated. The burner is provided with a series of spaced parallel elements 6 in the form of flat plates. The elements 6 are preferably shaped to provide a sharp edge at the discharge end. Streams of fuel gas and oxygen-containing gas are discharged through alternate openings 7a and 7b intermediate the plates, the fuel gas flowing through openings 7a and oxygen-containing gas through openings 7b. The fuel gas and oxygen containing gas are thus discharged in laminar streams, or as thin flat sheets in parallel flow.

Mixing of the gas streams takes place primarily as the result of eddy current diffusion at the interface between streams. This is in marked contrast to the usual method of mixing the gas streams by confluence of streams flowing at a considerable angle relative to one another or impingement of the gas streams.

In Figure 1, the fuel gas is designated "CH₄" or methane. It is to be understood, however, that various gaseous or vaporous fuels may be used. The legend "O₂" designates the oxygen-containing gas, which may be air, oxygen-enriched air, or relatively pure oxygen.

The choice of oxygen-containing gas depends upon the desired products. For example, if the burner is used for the preparation of feed gas for the synthesis of ammonia, air or enriched air is desirable as the oxygen-containing gas. On the other hand, if relatively pure carbon monoxide and hydrogen is desired, as for example, for the synthesis of hydrocarbons, relatively pure oxygen is preferable as the oxygen-containing gas.

With reference to Figures 2 to 5 of the drawings, the elements 6, corresponding to similarly designated elements in Figure 1, are in the form of a series of parallel spaced plates. The plates 6 are spaced to provide passageways 7a and 7b intermediate said plates for the flow of the fuel and oxygen-containing gases. The passageways are closed on three sides by a trough-like burner body member 8. The passageways are open along one edge of the plates to permit discharging a plurality of alternate streams of fuel gas and oxygen-containing gas as thin parallel sheets flowing in the same direction.

Oxygen is supplied to the burner through a pipe 9, and gaseous fuel through pipe 10. Distribution of the two gases to alternate slots 7a and 7b is accomplished by an arrangement of the plates 6 and spacers 11 and 12. Oxygen enters the burner assembly through an end plate 13 provided with an opening 14 cooperating with the end of pipe 9 to provide a passageway for the oxygen. Gas is admitted to the burner from pipe 10 through openings 16 in the end plate. An adapter 17 effects transition between pipe 10 and the openings 16. Similar passageways are provided for the oxygen and gas streams in each of plates 6. A solid end wall 19 confines the gases to the burner assembly, forming a closure for the passageways 14 and 16.

Cooling coils 18 are disposed along the sides and bottom of the burner assembly. A suitable liquid coolant, e. g., water, is circulated through the cooling coil to prevent overheating of the burner parts due to radiation from the reaction zone. The plates 6 are cooled to some extent by the flow of gaseous reactants over the surfaces of the plates and are further cooled by conduction of heat to the cooling coils.

Obviously many modifications and variations of the invention, as hereinbefore set forth, may be made without departing from the spirit and scope thereof and, therefore, only such limitations should be imposed as are indicated in the appended claims.

I claim:

1. A burner comprising a plurality of similarly shaped flat plates arranged in a stacked array and spaced not less than one thirty-second and not more than one-fourth inch apart from one another, each of said plates having a plurality of similarly shaped and positioned openings therethrough in register with one another defining the inner peripheries of separate conduits extending through said array, means disposed between each plate and the next adjacent plate, each of said means having at least one opening in register with a corresponding opening in said plates forming a continuous conduit from the extreme edge of one of said plates to the extreme edge of the other and formed to permit communication between at least one other of said openings and the space between said plates, said means being arranged between successive plates in an alternating manner to cooperate with alternate openings in said plates.

2. A burner comprising a plurality of flat plates of similar size in a stacked array, said plates being spaced from one another and each having a plurality of similarly shaped openings in register with corresponding openings in each other plate defining the inner peripheries of a plurality of separate conduits through said array, means interposed between each plate and the next adjacent plate forming a continuous closed conduit between an opening in said plate and a corresponding opening in said adjacent plate and formed to permit communication between another of said openings in said plates and the space between said plates, said means arranged cooperating with alternate openings in the spaces between alternate plates.

3. A burner structure comprising a plurality of flat rectangular plates of similar size in a stacked array spaced from one another in parallel planes forming interstices therebetween, each of said plates having a plurality of similarly shaped openings in register with corresponding openings in each other plate, said openings defining the inner periphery of separate conduits extending through said array, means disposed within said interstices joining the flat side of a plate with the flat side of the next adjacent plate and having at least one opening in register with an opening in each of said adjacent plates and formed to permit communication between another of said openings in said adjacent plates and the interstice between said plates, said means between alternate plates in said array cooperating with alternate openings in said plates.

References Cited in the file of this patent

UNITED STATES PATENTS

| | | |
|---|---|---|
| 227,852 | Snow et al. | May 18, 1880 |
| 1,400,024 | Caractristi | Dec. 13, 1921 |
| 2,003,226 | Weller | May 28, 1935 |
| 2,177,379 | Van Nuys | Oct. 24, 1939 |
| 2,449,359 | Abrams | Sept. 14, 1948 |
| 2,484,123 | Scherl | Oct. 11, 1949 |
| 2,553,199 | Loving | May 15, 1951 |
| 2,621,117 | Garrison | Dec. 9, 1952 |